J. TOROK.
WATER GAGE.
APPLICATION FILED FEB. 13, 1909.
928,082.
Patented July 13, 1909.
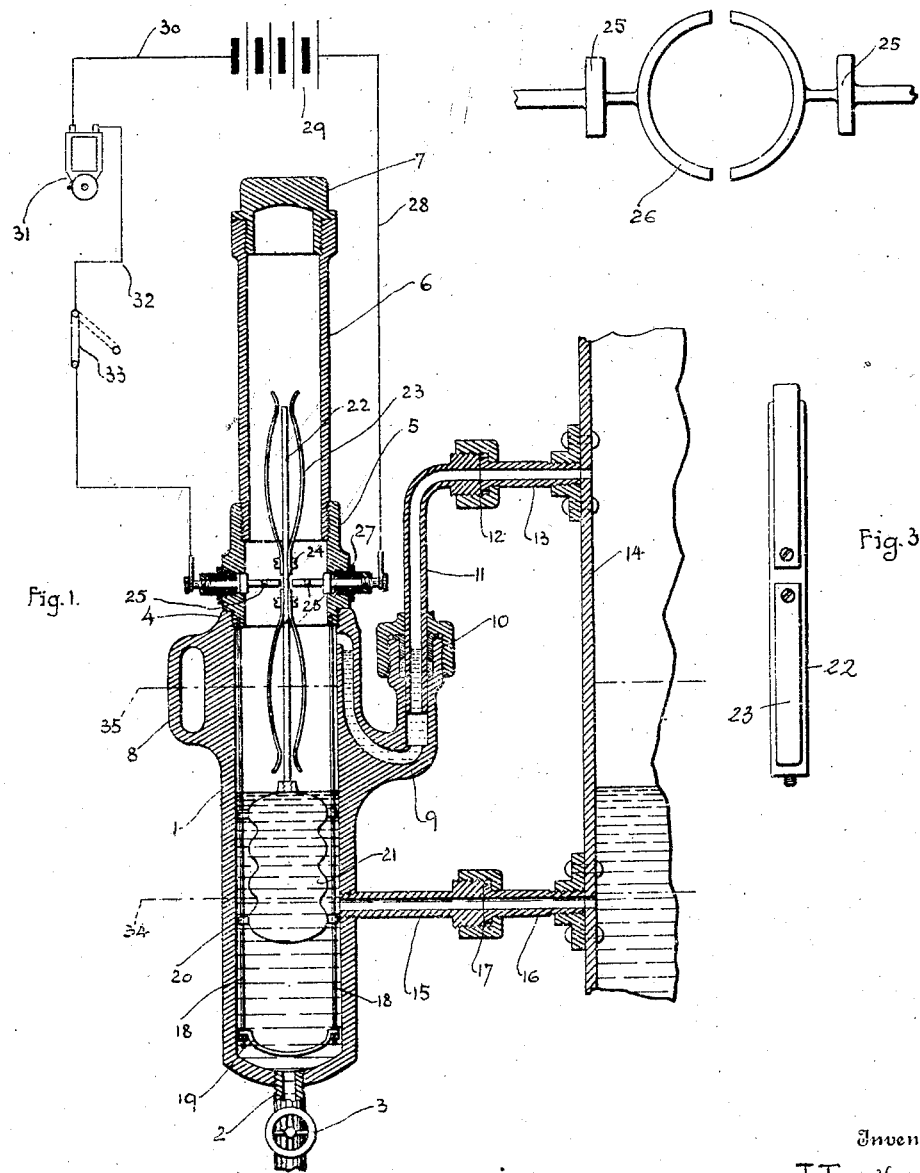

UNITED STATES PATENT OFFICE.

JULIUS TOROK, OF RENOVO, PENNSYLVANIA.

WATER-GAGE.

No. 928,082.  Specification of Letters Patent.  Patented July 13, 1909.

Application filed February 13, 1909. Serial No. 477,582.

*To all whom it may concern:*

Be it known that I, JULIUS TOROK, a citizen of the United States of America, residing at Renovo, in the county of Clinton and State of Pennsylvania, have invented certain new and useful Improvements in Water-Gages, of which the following is a specification, reference being had therein to the accompanying drawing.

This invention relates to water gages, and the object of the invention is to provide an audible signal in connection with a water gage for sounding an alarm when the water within the boiler reaches predetermined levels.

The water gage comprises a casing in communication with the boiler, and in the casing is located a float adapted to be raised and lowered by water admitted to the casing from the boiler. The casing is provided with electrodes and a circuit is established through said electrodes by resilient contacts movable with the float of the gage. Two alarms are sounded indicating high or low water, and these alarms are adapted to call the matter to the attention of an engineer in order that the supply water to the boiler can be discontinued or increased, respectively.

The invention will be hereinafter described in detail and reference will now be had to the drawings, wherein the preferred embodiments of the invention are illustrated, wherein, Figure 1 is a vertical sectional view of a gage constructed in accordance with my invention, Fig. 2 is a plan of the electrodes of the gage, and Fig. 3 is an elevation of the resilient contacts thereof.

In the accompanying drawings, 1 designates a cylindrical casing having the lower ends thereof closed, and provided with a drain pipe 2 having a suitable globe valve 3 for closing the pipe 2. The upper end of the casing 1 is interiorly screw threaded, as at 4, for a coupling member 5, and threaded in said coupling member is a housing 6 for a detachable cap 7.

Upon one side of the upper end of the casing 1 is located a handle 8, to facilitate the holding of the casing while the same is connected to a boiler, while upon the opposite side of the casing is located a gooseneck connection 9, having a stuffing box 10 for an elbow 11, said elbow having a stuffing box 12 for a pipe 13 communicating with a boiler 14. It is through the medium of the connection 9, elbow 11 and pipe 13 that the upper end of the casing 1 is placed in communication with the boiler 14. The lower end of the casing 1, communicates with the boiler 14 through the medium of pipes 15 and 16, said pipes being coupled together, as at 17.

The coupling member 5 is provided with depending guide rods 18, said rods having the lower ends thereof connected by a strap 19. Adapted to slide upon the rods 18 are the apertured lugs 20 of a float 21. Connected to the upper end of the float 21 is a vertical support 22 having an upper and lower set of resilient contacts, said contacts comprising curved or bow-shaped metallic arms 23, secured to the support 22, as at 24.

The coupling member 5 is provided with oppositely disposed electrodes 25, the inner ends of said electrodes being semi-circular, as at 26, to provide clearance for the central portion of the support 22. The electrodes 25 are insulated from the member 5, as at 27, and one of said electrodes is connected by a wire 28 to a suitable source of electric energy as a battery 29. The battery 29 is connected by a wire 30 to an electric bell 31, and said bell by a wire 32 to the other electrode, the switch 33 being interposed in the wire 32.

The normal level of the water within the boiler 14 and the gage is indicated, and if the water is lowered to the level indicated by a dot and dash line 34, the float 21 is lowered, causing the upper of said resilient contacts to engage the electrodes 25 and complete a circuit through the battery 29 and the electric bell 31. Should the water in the boiler rise above its normal level, the float 21 will be elevated allowing the lower set of resilient contacts to establish a circuit through the electrodes 25 and sounding an alarm.

Having now described my invention, what I claim as new, is:—

1. In a water gage, the combination with a boiler, of a casing, pipes connecting the lower end of said casing with said boiler, a goose-neck connection carried by the upper end of said casing and communicating with said boiler, a coupling member mounted upon the upper end of said casing, a housing carried by said member, a float slidably mounted in said casing, depending guides positioned within said casing for said float a vertical support carried by said float, upper and lower sets of resilient contacts secured to said support and oppositely disposed electrodes carried by said member and having oppositely-disposed semi-circular inner ends adapted to be engaged by said contacts for establishing a circuit to sound an alarm.

2. In a water gage, the combination with a boiler, of a casing having the lower end thereof communicating with said boiler, a goose-neck connection carried by the upper end of said casing and establishing communication between said casing and said boiler, a float arranged within said casing, depending guides positioned within said casing for said float upper and lower sets of resilient contacts supported by said float, oppositely disposed electrodes arranged at the upper end of said casing and having oppositely-disposed semi-circular inner ends adapted to be engaged by said contacts for sounding an electric alarm, and means arranged within said casing for guiding said float.

3. In a water gage, the combination with a boiler, of a casing having the lower end thereof communicating with said boiler, a goose-neck connection carried by the upper end of said casing and establishing communication between said casing and said boiler, a float arranged within said casing, depending guides positioned within said casing for said float upper and lower sets of resilient contacts supported by said float, and oppositely disposed electrodes arranged at the upper end of said casing and having oppositely-disposed semi-circular inner ends adapted to be engaged by said contacts for sounding an electric alarm.

In testimony whereof I affix my signature in the presence of two witnesses.

JULIUS TOROK.

Witnesses:
ANTON MECHANTE.
THEODORE TOROK.